(12) United States Patent
Tapia et al.

(10) Patent No.: US 10,505,789 B2
(45) Date of Patent: Dec. 10, 2019

(54) INTELLIGENT CONFIGURATION SYSTEM FOR ALERT AND PERFORMANCE MONITORING

(71) Applicant: TUPL, Inc., Snoqualmie, WA (US)

(72) Inventors: Pablo Tapia, Snoqualmie, WA (US); Rafael Sanchez-Mejias, Dallas, TX (US); Rafael Guerrero, Atlanta, GA (US)

(73) Assignee: TUPL, Inc., Bellevue, WA (US)

( * ) Notice: Subject to any disclaimer, the term of this patent is extended or adjusted under 35 U.S.C. 154(b) by 363 days.

(21) Appl. No.: 15/082,614

(22) Filed: Mar. 28, 2016

(65) Prior Publication Data

US 2017/0279669 A1 Sep. 28, 2017

(51) Int. Cl.
*G06F 15/173* (2006.01)
*H04L 12/24* (2006.01)

(52) U.S. Cl.
CPC ........ *H04L 41/0681* (2013.01); *H04L 41/069* (2013.01); *H04L 41/22* (2013.01)

(58) Field of Classification Search
CPC .... H04L 41/0681; H04L 41/069; H04L 41/22
USPC ........................................................ 709/224
See application file for complete search history.

(56) References Cited

U.S. PATENT DOCUMENTS

| | | | |
|---|---|---|---|
| 2002/0099578 A1 | 7/2002 | Eicher et al. | |
| 2004/0216004 A1* | 10/2004 | Singh | G05B 23/0254 714/25 |
| 2008/0097637 A1* | 4/2008 | Nguyen | G05B 17/02 700/110 |
| 2008/0262823 A1 | 10/2008 | Oslake et al. | |
| 2011/0040785 A1 | 2/2011 | Steenberg et al. | |
| 2013/0190095 A1* | 7/2013 | Gadher | G06F 11/008 463/42 |
| 2014/0176345 A1 | 6/2014 | Schiff et al. | |
| 2015/0135012 A1 | 5/2015 | Bhalla et al. | |
| 2016/0021173 A1 | 1/2016 | Tapia | |
| 2016/0147823 A1* | 5/2016 | Noll | H04L 67/1097 707/694 |
| 2016/0148099 A1* | 5/2016 | Micali | G06N 5/04 706/11 |

(Continued)

OTHER PUBLICATIONS

International Search Report & Written Opinion dated Jun. 16, 2017, for PCT International Application No. PCT/US2017024358, 9 pages.

*Primary Examiner* — Umar Cheema
*Assistant Examiner* — Hannah S Wang

(57) ABSTRACT

A method and system of creating an alert for a monitored network system. Key performance indicators (KPI's) of a plurality of components of a monitored network system are displayed on a user interface. A selection of one or more components of the plurality of components related to a malfunction is received. A present status and/or a pattern of performance of the one or more selected components is extracted. A preliminary alert is created based on the at least one of (i) the present status and (ii) the pattern of performance of the one or more selected components. Historical data related to the one or more selected components is retrieved. The preliminary alert is trained based on at least some of the retrieved historical scenarios. The preliminary alert is promoted to a primary alert upon training the preliminary to a confidence level that is above a predetermined threshold.

19 Claims, 7 Drawing Sheets

(56) References Cited

U.S. PATENT DOCUMENTS

2017/0060695 A1* 3/2017 Clare .................. G06F 11/1451

* cited by examiner

INTELLIGENT CONFIGURATION SYSTEM FOR ALERT AND PERFORMANCE MONITORING

BACKGROUND

System performance management in a computing system has traditionally been based on collection of data from multiple sources, which are then processed and presented to system administrators for analysis. Depending on the complexity of the system, different levels of aggregation, threshold detection, pattern recognition, etc., are applied to the data before it is presented for analysis. Such complex computing systems may generate thousands of dynamic performance metrics in the form of key performance indicators (KPI's) with time-varying values, which makes it challenging to manage the metrics manually. In this regard, automatic alerts may be used that are based on predetermined thresholds or rule sets that indicate a malfunction when triggered.

However, configuration of these rules for alerts, whether static or dynamic, is often difficult in that it may involve expertise in two separate disciplines. In particular, it requires a deep understanding of the relevant technology domain generally associated with a domain expert, and also mathematical skills generally associated with a data scientist, who provides the set of tools and/or algorithms to automate the collection, filtering, and analysis of the data. For example, a domain expert may be proficient in the relevant technology and the interrelationships between the various components of the monitored system. However, the domain expert may not be familiar with the tools and algorithms to automatically gather, filter, and analyze the vast amount of KPI's generated by a complex system. Indeed, such analysis is typically the realm of the data scientist, who may not have a deep understanding of the relevant technology and the interrelationships between the various components of the system.

While tool developers may use traditional approaches to find a compromise between domain experts and data scientists to provide customized solutions for defining and/or updating system alerts, such tight coordination between the two principles generally does not allow a quick turn-around time and typically results in the sub-optimal performance of the system.

Accordingly, it would be beneficial to have an automated and efficient way of developing intelligent alerts that are operative to diagnose existing and/or impending malfunctions in a complex system, such as a data network. It would also be beneficial to provide a method and system of creating intelligent alerts with a high confidence level that avoid false positives and do not require substantial mathematical knowledge. It is with respect to these considerations and others that the present disclosure has been written.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

This disclosure generally relates to methods and systems of configuring an alert for a monitored system. A scalable network backend is provided based on an open architecture that provides simplified access to data and increases automation in configuring an alert. The operational efficiency and the overall cost of operation of a hardware/software system is reduced by automation of functions by providing alerts that have a high confidence level. The use of big data technologies, complemented with machine learning approaches, simplify and automate complex tasks, resulting in a more efficient system operation.

In one aspect, the systems described herein provide an open platform where multiple data feeds from various sensors of the components of a complex monitored system are combined and processed in real time. In one embodiment, the system performs continuous monitoring of various components of a system and provides the monitored data to an alert server to be processed. The synthesized data harvested from various sensors together with stored contextual information is analyzed to generate alerts. In one aspect, the alert is trained in order to increase the confidence level.

By the system described herein complex performance issues of a monitored system can be identified without the substantial expertise required in traditional approaches, thereby decoupling the data science knowledge from the network domain knowledge. Instead, machine learning (ML) and/or rule based (RL) engines are used to determine patterns and trends in selected data to setup intelligent alerts. The alerts are confirmed and fine-tuned based on a training set. Consequently, alerts can be established without the requirement of the domain expert to have substantial data science knowledge.

Example System Architecture

Figure 1:
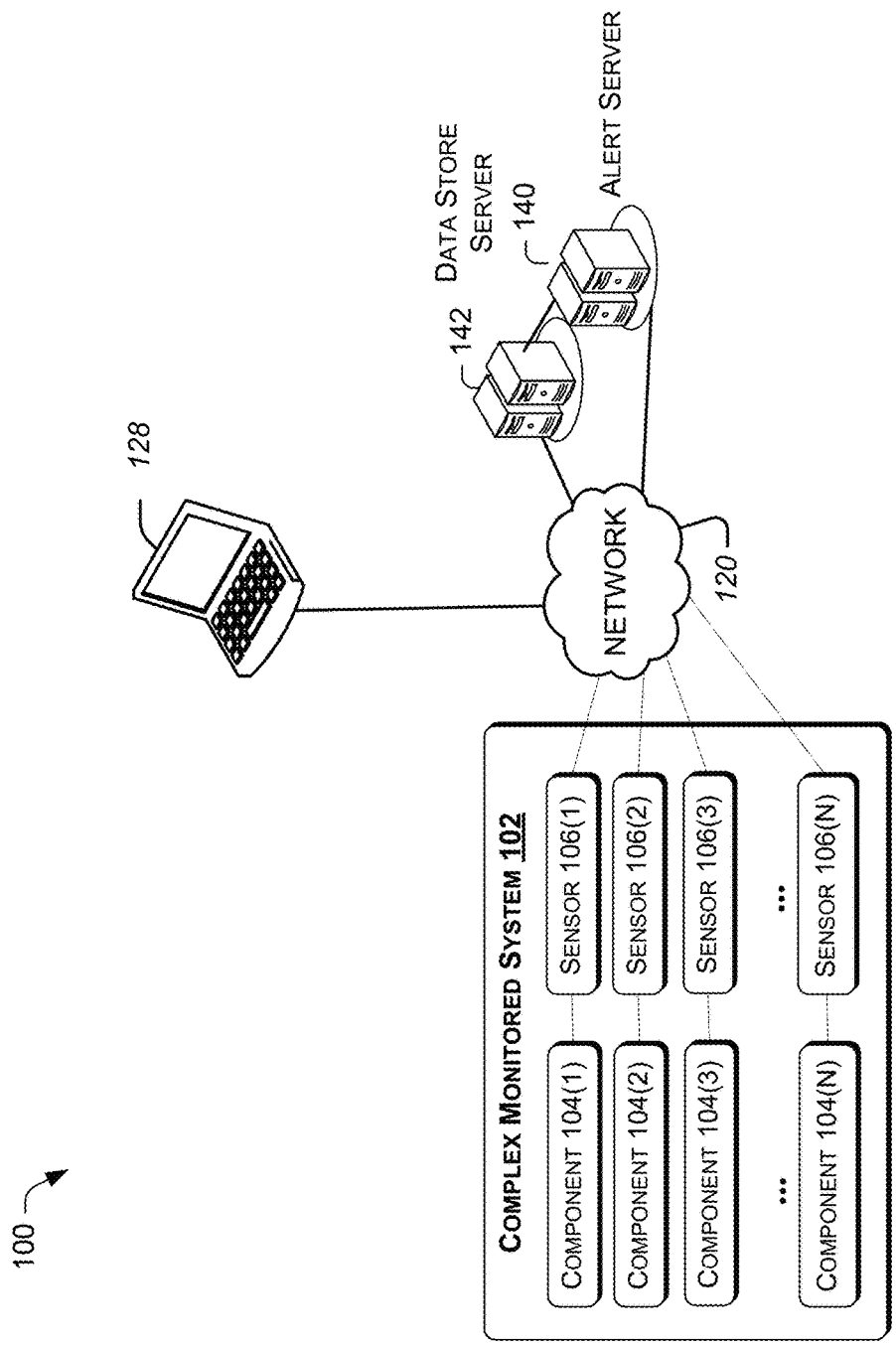
FIG. 1 illustrates an example architecture for implementing a system of configuring an alert.

FIG. 1 illustrates an example architecture for implementing a system of configuring an alert. Monitoring system 100 includes one or more systems 102. Each complex system 102, includes a plurality of components 104(1) to 104(N). In various embodiment, each component may be implemented in hardware or software. Each component may be coupled to one or more sensors 106 (1) to 106(N), which are configured to measure a performance and/or adjust one or more parameters of one or more components of the complex system 102.

In various embodiments, depending on the type of system 102 (e.g., computing environment, industrial plant, software application, etc.) the sensors 106(1) to 106(N) may monitor a variety of status information, such as signal to noise ratio (SNR), number dropped uplink requests, a number of downlink requests, throughput, volume of traffic, number of resets in a predetermined period, round trip delay, etc. In some embodiments, the sensor not only measures data but also provides adjustment of parameters of the corresponding component. While each component has been illustrated in FIG. 1 by way of example to have a corresponding sensor, it will be understood that sensors may be shared among various components and there may be multiple sensors for a component.

Accordingly, each sensor 106(1) to 104(N) provides continuous monitoring at predetermined intervals (and/or upon request from the alert server 140) and provides the monitored data to the alert server 140. Thus, in one embodiment, a sensor not only collects performance data at predetermined intervals, but also provides real-time data access capability to the alert server 140 via a network 120. The network 120 may be, without limitation, a local area network ("LAN"), a virtual private network ("VPN"), a cellular network, or the Internet.

In one embodiment, monitoring system 100 includes a data store server 142, which is coupled for communication via the network 120. The data store server 142 stores contextual information, which is based at least on the data received from the sensor's from one or more complex monitored systems, such as system 102.

The information from the data store server 142 can be used by the alert server 140 to determine key performance indicators (KPIs) of the sensor's to create and fine-tune (e.g., train) alerts for the complex system 102. Accordingly, the alert server 140 is configured to receive component performance measurement data from sensor's 104(1) to 104(N) and analyze the received data in view of the contextual information provided by the data store server 142. It is to be appreciated that the data store server 142 includes information from the entire system 100, which may include many (e.g., thousands) of sensors associated with complex system 102.

Accordingly, the alert server 140 is configured to analyze the component performance measurement data received from each sensor together with the contextual information from other sensors. Based on this analysis, the alert server 140 determines whether one or more predetermined conditions are met, thereby determining the confidence level in the alert.

In various embodiments, the alert server 140 may retrieve contextual information from the data store server 142, wherein the contextual information includes at least one of the following: (i) historical information of one or more components selected by a system administrator via a user interface of a computing device, sometimes referred to herein as user equipment (UE)) 128, and (ii) one or more components preprogrammed by a system administrator (sometimes referred to herein as the domain expert). The one or more components preprogrammed by the system administrator are ones that may be responsible for the successful operation of the one or more components selected via the user interface. For example, if a system administrator identifies via the user interface of a computing device 128 that a component 104(1) of the complex monitored system 102 is malfunctioning, the alert server may analyze the data of additional components (e.g., 104(2)) that are known to be responsible for the successful operation of the subject component (i.e., 104(1)). Thus, even though the system administrator may select component 104(1) as a candidate for a potential alert, the alert server may also analyze the data of component 104(2) because an expert may have preprogrammed the alert server 140 to also look at component 104(2) when component 104(1) is selected for evaluation.

By way of example, supporting tools may include utilities to perform relative comparison of current KPI metrics with aggregated KPI's from a geographical area, time, sensor, or group of sensors. Supporting tools may also include intermediate alerts generated by an anomaly detection algorithm (e.g., by an anomaly detection processor) that may bring KPI variations to the attention of the system administrator.

The alert server 140 computes KPI's for the various components (or combinations thereof) of the complex system 102 based on the information that the alert server 140 receives from the one or more sensors 106(1) to 106(N). The metrics included in the information are displayed on a user interface of a computing device 128 in the form of a report. In various embodiments, the information may be presented as a snapshot in time or in aggregate over time. Thus, the KPI's are consolidated on the user interface of a computing device 128. The system administrator may interactively select the malfunctioning component(s) via the user interface based on the report provided by the alert server 140. An interactive dashboard is discussed later in the context of FIG. 4.

For example, a system administrator may be presented with a report of the health of the complex system 102 including a data transmission flow, number of data packets, bandwidth issues, etc. The system administrator may indicate an alert condition by selection of one or more symbolic representations of the components of the complex system 102 that the system administrator has deemed to be malfunctioning. In various embodiments, the system administrator may fine-tune the selection by identifying specific data ranges in magnitude and/or in time. For example, a present status is a data point in time for each selected metric of a component. A pattern of performance may be selected over time. An aggregate pattern of performance is based on the present status and/or patterns of performance of multiple components. The selected components as well as the data points and ranges selected thereof are sometimes referred to herein as a "selected input," which is the source of a preliminary alert. The more detailed (e.g., fine-tuned) the alert is, the higher the confidence level in the alert.

This selected input is received by the alert server 140 to convert the preliminary alert into an alert that is of a high confidence level. To that end, the alert server 140 is configured to train the preliminary alert by using the contextual information retrieved from the data store server 142. Thus, the contextual information is used as a training set for the preliminary alert to advance it into a primary alert.

Historic data related to the one or more selected components is retrieved from the data server 142 that has at least one of (i) a status and (ii) patterns of performance that match within a predetermined first tolerance of the present status and pattern of performance of the preliminary alert. In various embodiments, the contextual information may be based on historic data of (i) the same components selected, (ii) other substantially similar components from this complex monitored system 102, (iii) or other complex systems that have components that are similar to those selected by the system administrator for the preliminary alert. As used herein, a similar type of component is one having a substantially similar function, hardware, and/or software. The preliminary alert is then trained by iteratively testing the preliminary alert on the contextual information from the data store server 142 until a threshold (e.g., high) confidence level is reached in the alert.

Accordingly, in one aspect, the monitoring system 100 described herein allows the sharing of information from multiple systems and their corresponding components, which not only improves the confidence level in an alert during training, but also allows applying the learning obtained with respect to one component to other similar type components. The actual operation of the system 100 is described by way of an example process later.

For discussion purposes, the alert server 140 and the data store server 142 can each be a stand-alone computing device such as a server, or be on a single server. Thus, the functionality described herein with respect to each of the servers 140 and 142 can also be provided by one or multiple different computing devices. In other words, the alert server 140 and data store server 142 need not be a stand-alone computing devices but can be combined in a single server.

Example Functional Blocks

Figure 2A:
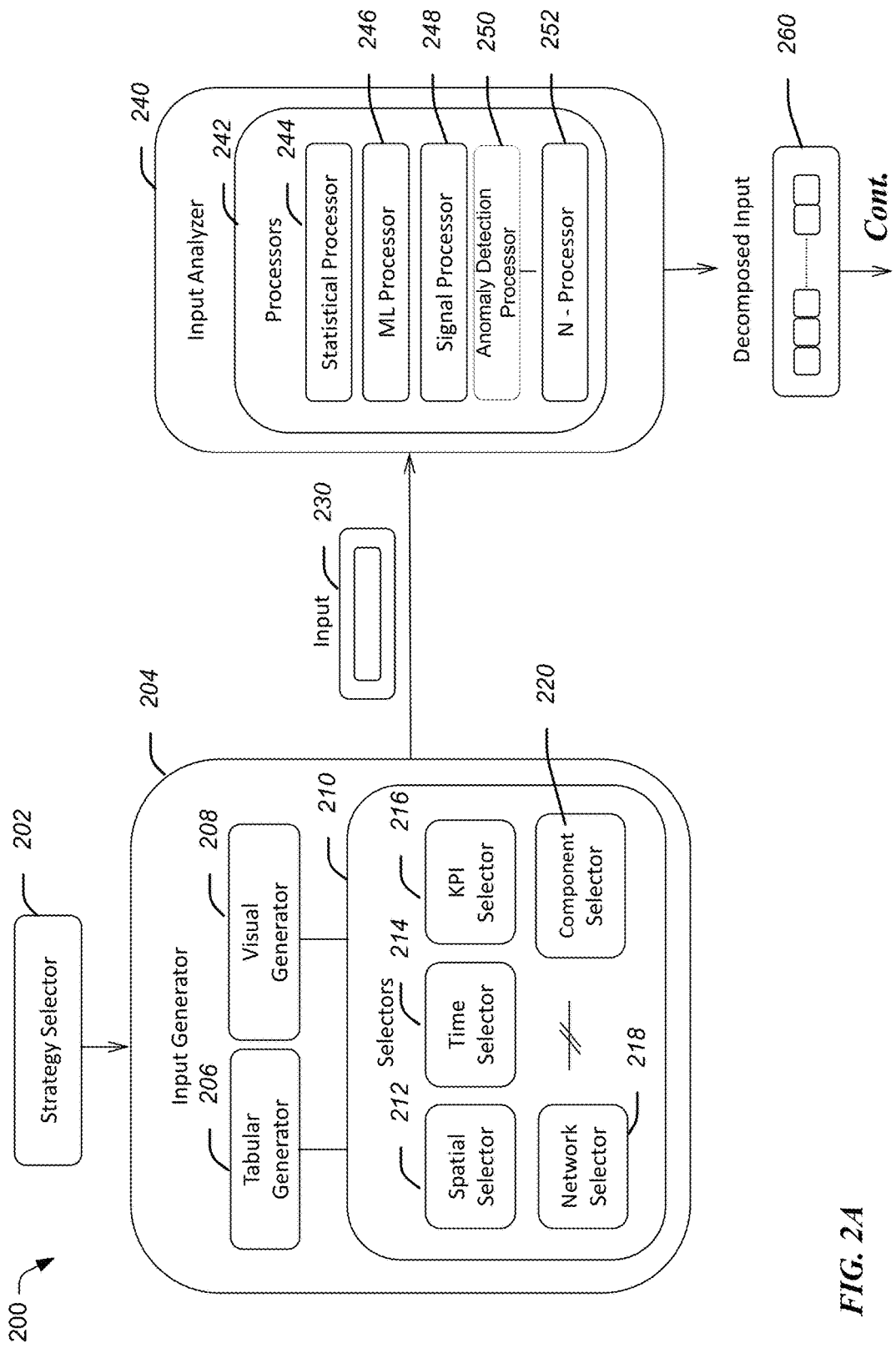
FIG. 2A is a block diagram of a data framework of an alert creation system.
Figure 2B:
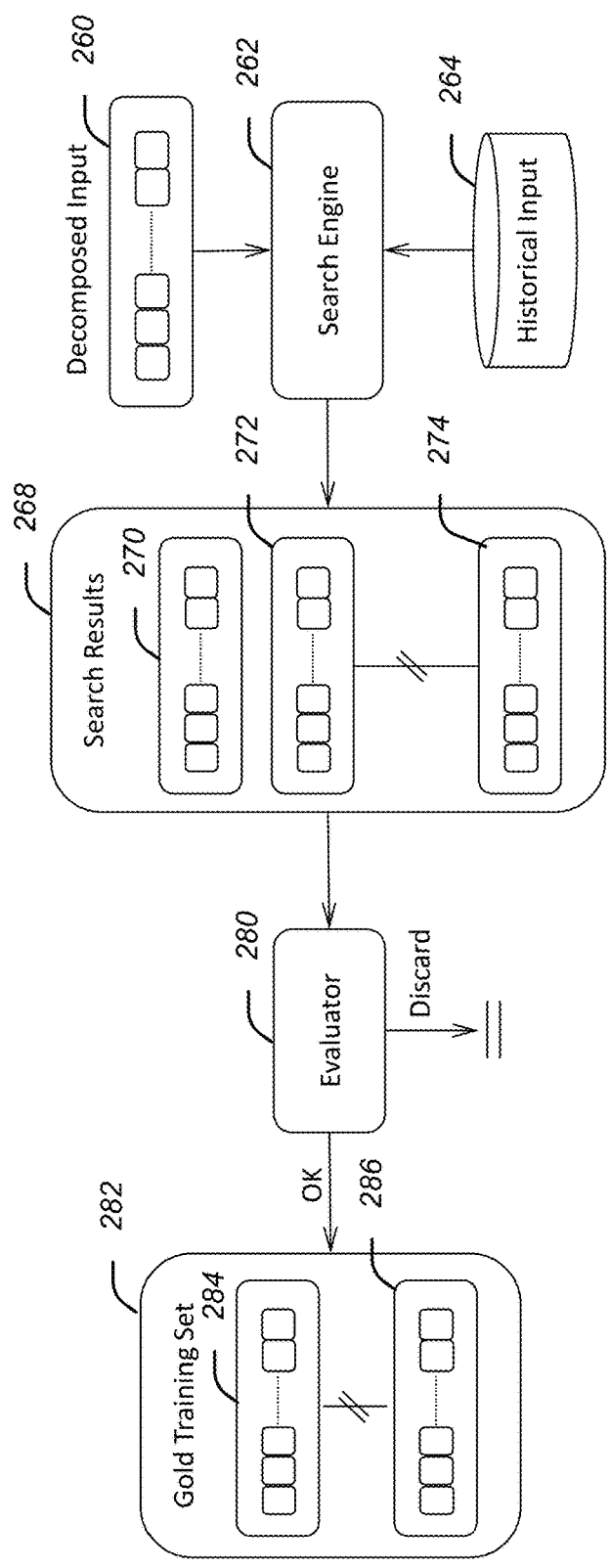
FIG. 2B is a continuation of the block diagram of FIG. 2A.

Reference now is made to FIGS. 2A and 2B, which collectively illustrate a block diagram of a data framework of an alert creation system 200, consistent with an exemplary embodiment. The blocks and/or sub-blocks of the alert creation system 200 can be implemented in hardware, software, or a combination thereof.

Alert system 200 includes a strategy selector 202 operative to allow a selection of a type of an alert calculation strategy to be used. For example, the calculation strategy may identify whether to perform analysis in the time domain, frequency domain, geographical domain, and the like. The alert system 200 also includes an input generator 204 operative to provide one or more utilities to describe the components of the monitoring system 100 of FIG. 1. The input generator 204 may include various sub-blocks, including a tabular generator 206, a visual generator 208 and various selectors 210. The various selectors may include a spatial selector 212, a time selector 214, a KPI selector 216, a network selector 218, a component selector 220, etc.

For example, several predefined charts, reports, counters, KPIs and configuration settings for different aggregation levels of one or more components of a system can be displayed on a dashboard of a computing device 128, to be viewed by a system administrator. In one embodiment, such metrics may be automatically collected at predetermined intervals by the alert server 140 as general performance monitoring and maintenance. Accordingly, such dashboard may provide the dual purpose of (i) displaying KPI's of the components of the system as part of general monitoring of a system, and (ii) receiving information from the system administrator to create a preliminary alert, which can be trained to ultimately become a primary alert. In this regard, the input 230 selected by the system administrator is provided to an input analyzer 240 of the alert server 140. The alert server may include a plurality of processors 244 to 252, including a statistical processor 246, a signal processor 248, an anomaly detection processor 250, etc.

The input analyzer block 240 is configured to receive the raw input 230 from the input generator 204 that is provided by the system administrator via the user input (e.g., dashboard of the display). The input analyzer 240 analyzes the input 230 from the input generator 204 and provides a decomposed output 260, sometimes referred to herein as a preliminary alert. The preliminary alert is based on the present status of the one or more selected components and/or a pattern of performance of the one or more selected components.

If multiple components are selected by the system administrator to be interrelated in a malfunction of the system, then the performance of the combination of the components is used to develop the preliminary alert 260.

Accordingly, the input analyzer 240 takes the selections in input 230 provided by the system administrator and translates them into one or more mathematical representations using different types of processors 244 to 252, depending on the type of input 230. The type of inputs may include, without limitation, time series, single snapshots of KPI values from multiple sensors, geographical/hierarchical KPI series, and the like. For example, a signal processor 248 may be used to apply a Fast Fourier Transform (FFT) to the selected data 210 from a time series to extract series descriptors such as frequency components.

Alternatively or in addition, the statistical processor 244 may determine the mean, standard deviation, maximum, minimum, trend, percentile, etc. for the selected input KPI's. There may be an anomaly detection processor 250 that may provide intermediate alerts generated (e.g., by an anomaly detection algorithm of the anomaly detection processor 250) that may bring KPI variations to the attention of the system administrator. One or more additional processors 252 may be implemented based on feedback provided from machine learning of the input analyzer 240.

Continuing with FIG. 2B, the decomposed output (e.g., preliminary alert) 260 is used as an input 260 for a search engine 262. The search engine 262 uses the description of the preliminary alert provided as the decomposed input 260 from the input analyzer 240 together with a data store server 264. The data store server 264 provides contextual information for the one or more components selected by a system administrator via a user interface of the input generator 204.

Thus, the search engine 262 extracts historical data related to the one or more selected components from the data store server 264. More particularly, the search engine 262 retrieves historical data related to the one or more selected components that has a status and/or patterns of performance that match within a predetermined first tolerance of the present status and pattern of performance of the one or more selected components. Put differently, the search engine retrieves data from the data store server 264 that matches the preliminary alert within a predetermined tolerance. In various embodiments, if the first predetermined tolerance does not provide sufficient results, a wider tolerance is provided to capture one or more historical scenarios. These historical scenarios later become the training set for the preliminary alert to advance it to a primary alert.

In one embodiment [discuss support tools here?]

In one embodiment, the search engine 262 additionally extracts historical data of components that have been preprogrammed by a domain expert to be responsible for the successful operation of the one or more components selected in the input generator 204. Accordingly, the search results 268 include the preliminary alert 270 received from the input analyzer, as well as contextual information (e.g., 272, 274) received from the data store server 264.

The search results are provided to an evaluator 280. In one embodiment, the evaluator may be an individual (e.g., the system administrator) who validates which generated examples (e.g., historical data) retrieved from the data store server 264 meet the conditions of the alert. In various embodiments, the evaluation may be iterative in that different permutations of situations may be presented with varying (e.g., tightening tolerance) to increase the confidence level in the alert. Put differently, the metes and bounds of the alert may be trained in the evaluation block 280. The scenarios (i.e., based on the historic status or patterns of performance of the one or more components) that are not validated are discarded, thereby tightening and increasing the confidence level of the alert. The process may continue until a predetermined threshold confidence level is reached in the alert, promoting the scenario of the alert to a gold training set 282 that may be used as a machine learning (ML) training set and/or to adjust rule based (RL) thresholds for a primary alert.

In one embodiment, the evaluator may be a custom software that validates the generated example scenarios based on the historical data. The example scenarios that meet threshold criteria are promoted to a gold training set 282, thereby providing a primary alert having a confidence level that is above a predetermined threshold.

Example Call Flow Process

Figure 3A:
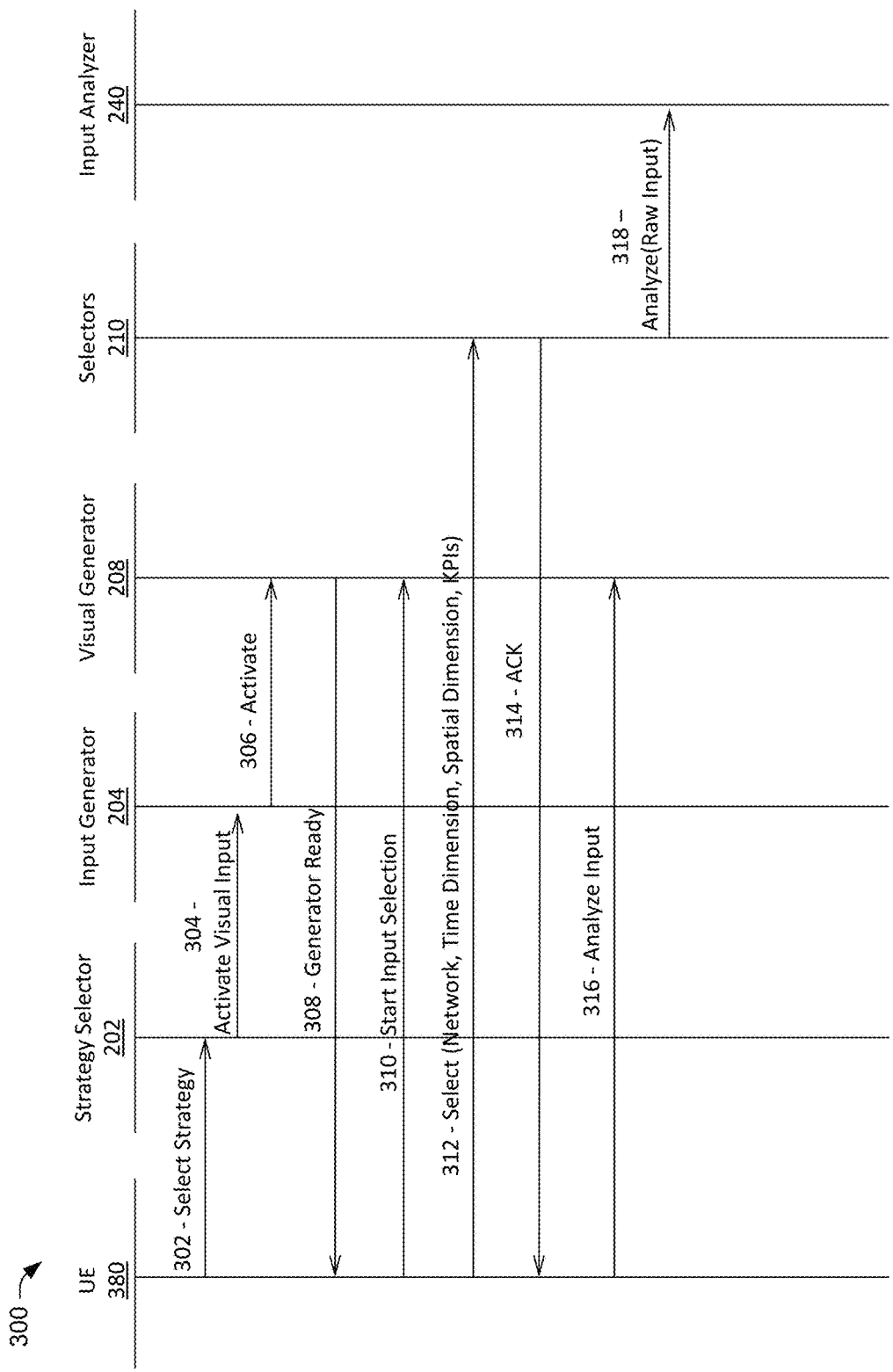
FIG. 3A illustrates a high level example call flow for the creation of a preliminary alert.
Figure 3B:
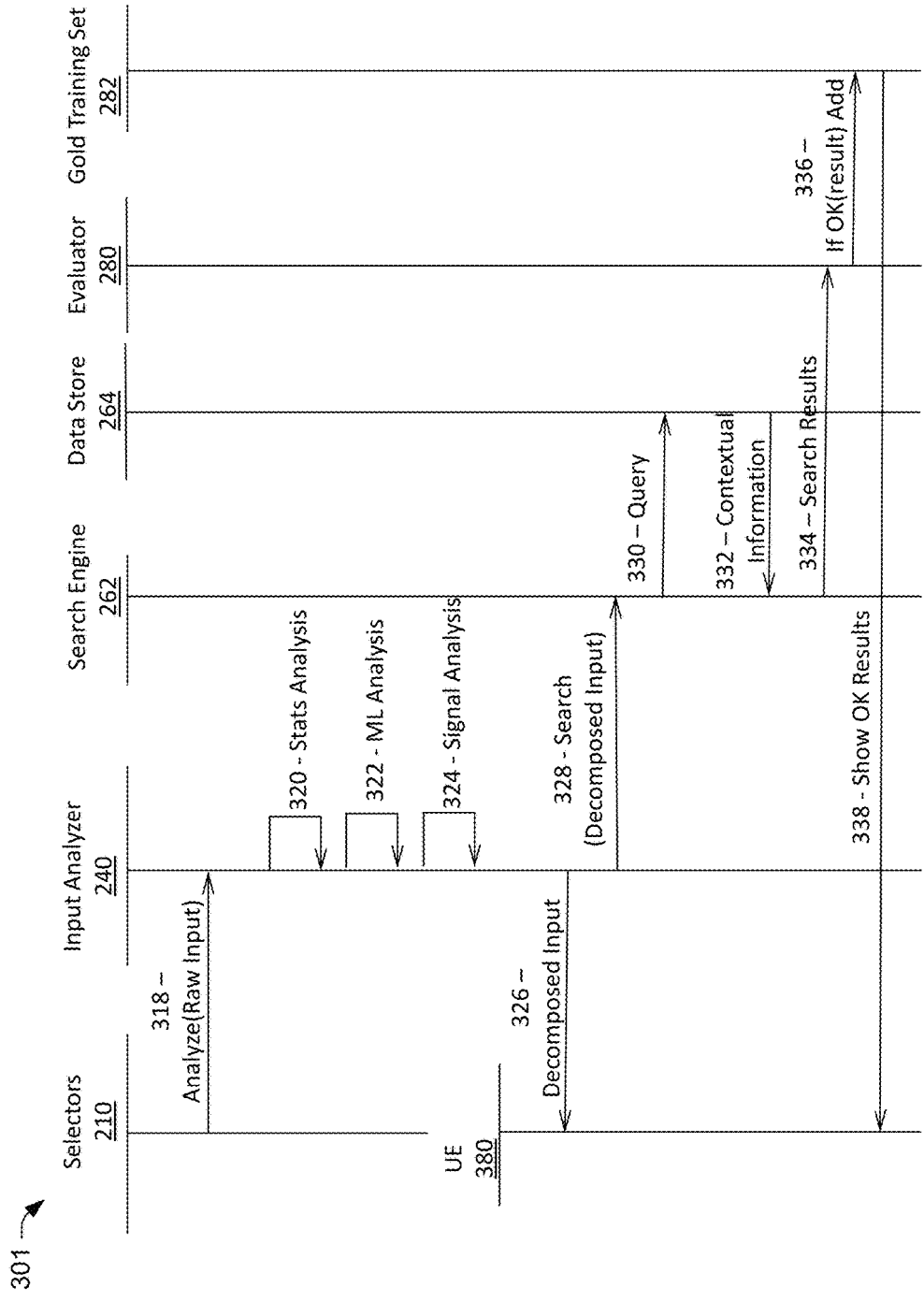
FIG. 3B illustrates the training of a preliminary into a primary alert.

With the foregoing overview of the monitoring and alert system, it may be helpful now to consider a high-level discussion of example call flow processes. To that end, FIGS. 3A and 3B illustrate high level example call flow processes for creation of an alert for complex system. In particular, FIG. 3A illustrates a high level example call flow for the creation of a preliminary alert and FIG. 3B illustrates the training of a preliminary into a primary alert. The call flow processes 300 and 301 are illustrated as a collection of blocks in logical call flows, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 301 are described with reference to the architecture 100 of FIGS. 1 and 2A/2B.

By way of example, call flow process 300 includes a strategy selection block 202, an input generator block 204, a visual generator block 208 and one or more selectors 210. In step 302, the strategy selector 202 receives a selection of the alert calculation strategy from a system administrator via their user equipment (UE) 380. Today, UE's typically take the form of personal computers, portable handsets, smartphones, tablet computers, personal digital assistants (PDAs), smart watches, etc. Different strategy selection options may be offered on the display of the UE 380 of the system administrator.

Upon selection of the alert calculation strategy, the input generator 204 receives the confirmation from the strategy selection block 202 in the form of a request to activate the visual input 304 to facilitate the system administrator in the selection of one or more components of the complex system 102 that are of concern. To that end, the input generator block 204 sends a request to the visual generator block 208 to activate the visual input for the UE 380. Thus, the input generator 204 provides one or more utilities to describe the components of the complex monitored system 102 of FIG. 1.

Upon completion of the activation of the various utilities, in step 308, the visual generator block 208 sends a confirmation to the UE 380 that the input generator is ready to receive inputs via the UE 380.

In step 310, the input selection is received by the visual generator from the UE 380. For example, the system administrator may select one or more components of the system via the user interface of the UE 380. In this regard, the system administrator may select a single component or a plurality of interdependent components of the complex system 102 that are part of a single interrelated malfunction. This selected input is later used as the subject matter for creating a new preliminary alert.

In various embodiments, in step 312 the system administrator may further narrow the selection specifying data points or ranges and/or time periods of KPI's of the selected one or more components that are deemed to be malfunctioning by themselves or in combination. The various selectors may include a spatial selector 212, a time selector 214, a KPI selector 216, a network selector 218, a component selector 220, etc.

For example, several predefined charts, reports, counters, KPIs and configuration settings for different aggregation levels of one or more components of a system can be displayed on a dashboard of the UE 380, to be viewed by the system administrator. The system administrator may drill down to select specific sub-components. Corresponding performance metrics may be narrowed in time and/or magnitude. Such selection is explained later in the context of the dashboard of FIG. 4.

In step 314, the selection block sends an acknowledgment to the UE 380 indicating that the components, data points, ranges, time periods, magnitudes, etc. have been received by the selection block. In step 316, an instruction may be sent by the system administrator via the UE to the visual generator block 208 to analyze the raw input provided. In turn, in step 318, the selection block 210 instructs the input analyzer block to analyze the raw input. This raw input is the basis for a preliminary alert, which can be trained to increase its confidence level, discussed in the context of call flow process 3B below. Accordingly, the system administrator is able to characterize a preliminary alert without much effort and special data science knowledge.

Reference now is made to FIG. 3B, which illustrates the training of a preliminary alert into a primary alert. In the example of call flow process 301, the training of the preliminary alert includes a selector block 210, an input analyzer block 240, a search engine block 262, an evaluator block 280, a gold training set 282, and UE 380. In one embodiment, call flow process 301 is a continuation of call flow process 300.

As discussed in the context of call flow process 300, in step 318 the selection block 318 instructs the input analyzer block to analyze the raw selected input, which is the basis for a preliminary alert. The raw input data may include a component that has been identified by system administrator to be malfunctioning via the UE 380. In one embodiment, several components are identified to be malfunctioning in aggregate. The raw data may further include specific data points or ranges and/or time periods of the KPI's of the selected one or more components that have been identified to be malfunctioning.

Next, the input analyzer block 240 performs various analysis, such as statistical analysis 320, ML analysis 322, and/or signal analysis 324 on the raw input data. The statistical analysis 320 may include determining the mean, standard deviation, maximum, minimum, trend, percentile, etc., of the KPI's for the one or more components identified by the system administrator to be malfunctioning.

In step 326, the input analyzer 240 provides a decomposed input to the UE 380, to be reviewed by the system administrator. The decomposed input is also sent to the search engine 262 (i.e., step 328). The decomposed input represents a preliminary alert, which is based on the present status of the one or more selected components and/or a pattern of performance of the one or more selected components (i.e., from call flow process 300). If multiple components were selected to be interrelated in a malfunction of the system, by the system administrator (i.e., steps 310, 312 from call flow process 300), then the performance of the combination of the components is used to develop the preliminary alert.

In step 330, the search engine 262 uses the description of the preliminary alert provided as the decomposed input in step 328 to send a query to the data store 264 to retrieve historical data related to the one or more selected components. To that end, in step 332, the data store server 264 provides contextual information for the one or more components. More particularly, the search engine 262 retrieves data from the data store server 264 that matches the preliminary alert within a predetermined tolerance.

In step 334, the search results are provided to an evaluator 280. In various embodiments, the evaluator may be an individual (e.g., the system administrator) or may be implemented in software. Put differently, in one embodiment, the evaluator 280 and the UE 380 may share the same role.

The evaluation may be iterative in that different permutations of situations may be presented with varying (e.g., tightening tolerance) to increase the confidence level in the alert. Each different permutation of an alert based on different tolerances, provides a different scenario of evaluation. The scenarios (i.e., based on the historic status or patterns of performance of the one or more components) that are not validated are discarded. The process may continue until a predetermined threshold confidence level is reached in the alert, promoting the preliminary alert into a primary alert. In one embodiment, the primary alert is used as a gold training set 282 (i.e., step 336). The gold training set 282 may be used as a machine learning (ML) training set and/or to adjust rule based (RL) thresholds for a primary alert.

Example User Interface

Figure 4:
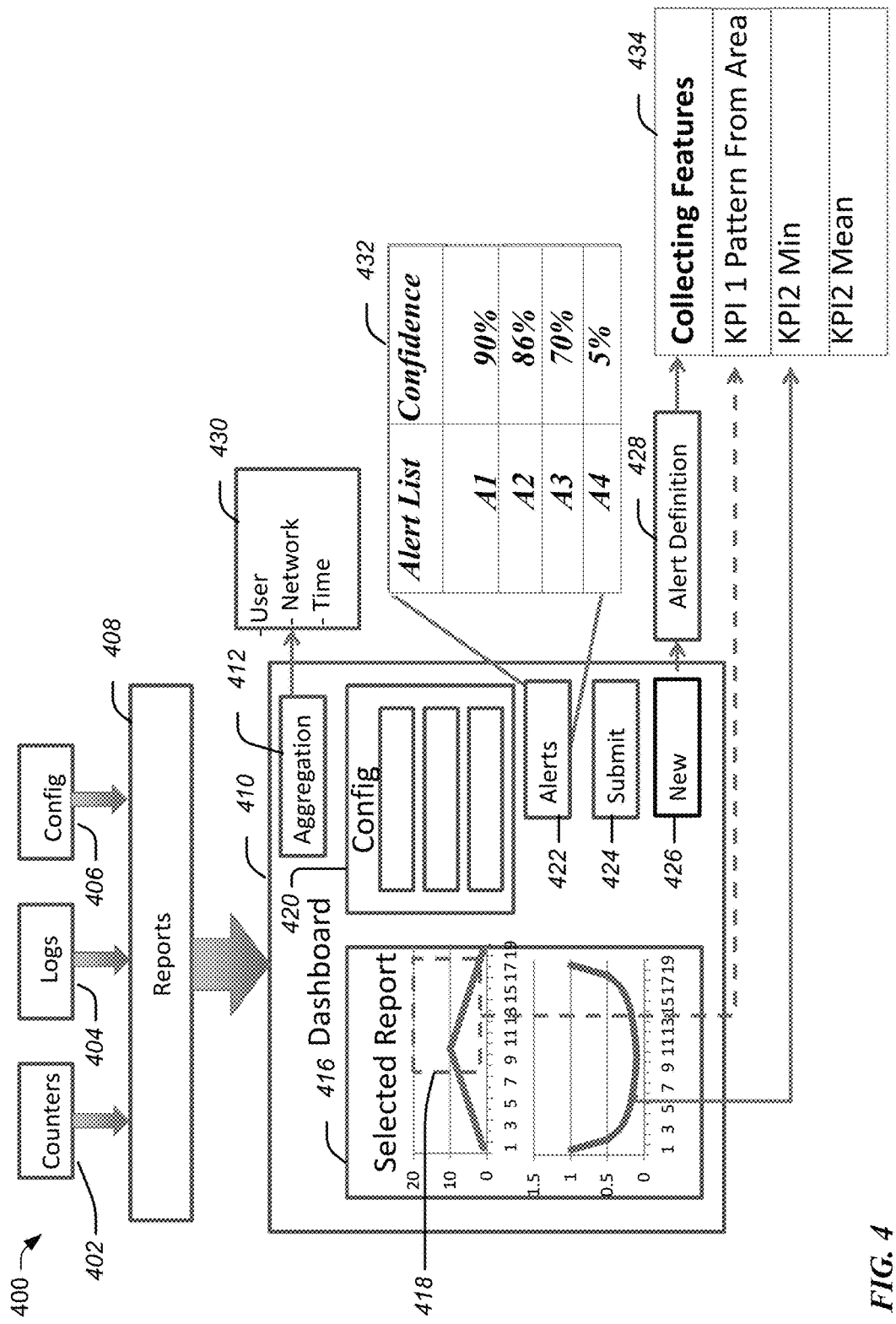
FIG. 4 illustrates an example user interface for alert validation and feature selection.

FIG. 4 illustrates an example user interface for alert validation and feature selection. Interface 400 may include data from various sensors, which are consolidated in one or more files, such as counter 402, log 404, and configuration 406 files of the components of a complex system. These files are operative to create a report 408 of the complex system. In one embodiment, the report 408 is provided by the alert server 140 of FIG. 1 at predetermined intervals or upon request from via a UE by the system administrator.

The metrics of the report, including the KPI's of the complex system, are displayed on a user interface of a computing device 128 in the form of a dashboard 410. In various embodiments, the information may be presented as a snapshot in time and/or in aggregate over time, as illustrated in the display of the selected report 412. The system administrator may indicate whether the aggregation is temporal or geographical in the network (i.e., 430). For example, the system administrator may indicate when the malfunction occurred and at which geographic part of the network.

Thus, the KPI's are displayed in a consolidated way on the user interface of a computing device 128. The system administrator may interactively select the malfunctioning component(s) via the dashboard based on the report provided by the alert server 140. The system administrator may drill down to select specific features 434, such as specific patterns 418, time ranges, magnitudes, delta in time, etc. In one embodiment, a range may be selected on the dashboard 410 and additional statistical analysis applied, such as the mean, standard deviation, maximum, minimum, trend, percentile, etc. of the selected range of the KPI's for the one or more components identified by the system administrator to be malfunctioning. In one embodiment, the system administrator can specify the number of times an event has to occur in a predetermined time period to qualify as a malfunction to warrant an alert.

In one embodiment, the system administrator can also indicate the configuration settings 420 for different aggregation levels of one or more components of the system. During "normal" operation (i.e., general performance monitoring and maintenance—instead of alert creation), the dashboard may be used for displaying KPI's of the components of the system. Accordingly, in one embodiment, dashboard 410 provides a dual purpose of (i) displaying KPI's of the performance of the complex system, as well as (ii) being an interface for creating and validating an alert.

The dashboard 410 may provide a list of currently active alerts 432 by asserting block 422. In one embodiment, the system administrator may select which active alerts are "OK" and those that are not. For example, an active alert may be discarded or marked for further training to improve the confidence level, such that it is later promoted to a primary alert. The confidence level is an indication of how reliable the alert is.

The system administrator may initiate a new alert by selecting the "New" block 426. The system administrator may provide additional background information, such as the name of the alert, the strategy selection, etc. This background information is part of the alert definition 428. While the alert definition is active, the system administrator may select a component that are deemed to be malfunctioning or a combination of components that are deemed to be malfunctioning in concert.

As discussed above, the system administrator may select multiple components and/or parameters that in combination qualify as a malfunction for alert purposes. To that end, the system administrator may use a "hold" and/or "next" features that are operative to add additional components and/or data ranges to create a combination of components. Put differently, the system administrator may combine the KPI's of multiple components in order to create an aggregate pattern of performance based on the KPI's of the combination of components. In one embodiment, the dashboard 410 may provide logical operators, such as AND, OR, NOT, etc. to create the above aggregate combination pattern of performance.

In one embodiment, the dashboard 410 may provide an option to specify that the pattern of performance of the selected component(s) is an absolute (has zero tolerance). Put differently, an alert should be generated only if the pattern of performance of the system monitored matches exactly. In this regard, the confidence level in the alert is 100%. In other embodiments, the pattern of performance of the system monitored may vary based on predetermined tolerance thresholds.

The alert definition 428 may be combined with the collected features 434 that were provided by the system administrator via the dashboard 410 to create a preliminary alert, which may be later trained into a primary alert. For example, a preliminary alert is an alert based on the present status and/or pattern of performance of the one or more selected components that has not undergone any additional training. If the evaluator deems the alert to be of high confidence value (above a predetermined threshold—such as 85%), then the preliminary alert is automatically promoted to a primary alert. If the confidence level in the preliminary alert is at or below the predetermined threshold, then it can be trained based on contextual information retrieved from the data store server 142, to reach a higher confidence level. When the confidence level reaches the predetermined threshold (e.g., 85%), then the preliminary alert is promoted to a primary alert. In various embodiments, an alert remains in the training mode until it reaches a confidence level that warrants its promotion to a primary alert (e.g., 85% confidence level). In various embodiments, non-primary alerts may be not be run at all to avoid false positives or may be run with a low priority.

An alert can be trained in multiple ways. For example, as discussed in more detail in the context of FIG. 2B above, a search engine 262 in combination with a data store server 264 can provide an evaluator different scenarios of pattern of performance of the one or more selected components based on historic data. The different scenarios are within different permutations of variation from the preliminary alert that is being trained. Based on the interactive feedback from the evaluator, the preliminary alert can be trained into a primary alert that provides a confidence level that is above a predetermined threshold (e.g., 85%).

Another way of training an alert is based on historical data where the malfunction has already been identified by prior manual analysis. For example, the malfunction has been identified before and stored in the data store server, but an alert may not have been created for the malfunction. If the data store server provides contextual information indicative that there are a sufficient number of instances where this malfunction has been identified, the confidence level in the alert is raised accordingly.

Example Use Case

With the foregoing explanation of the system and method of configuring an alert, it may be helpful to provide a high level discussion of an example use case. In this regard, consider a system administrator troubleshooting a telecommunication network. For example, a notification may be received that a user is experiencing dropped calls and a periodically slow internet connectivity on their handheld device. To resolve the malfunction, the user may call a support center, ultimately leading to a trouble ticket with a preliminary description of the malfunction.

The system administrator invokes the dashboard 410 discussed herein to review the KPI's of the telecommunication network, as well as review existing alarms. In various scenarios, the system administrator may identify the malfunction by viewing the KPI's in the dashboard or may not immediately decipher what the root cause of the malfunctions. Regardless, the system administrator may want to establish an alert to automatically be notified of the next instance of the malfunction or to prevent it from re-occurring.

Based on the information provided on the dashboard, the system administrator selects several components that in combination are related to dropped calls. The system administrator may drill further into each component and select the dropped call time series for that user for a predefined period (e.g., month). Further, magnitude levels that exceed predetermined thresholds for one or more components are identified by the system administrator. Additional selections may include time series where the data throughput was too low and the geographic location of the network when the malfunctions occurred. The system administrator may also include the type of component (e.g., operating system and model) of the handheld device that is experiencing the malfunction, to the extent the system administrator finds such data relevant in defining an alert.

The above selections provide an input 230 to an input analyzer 240, which translates the metrics to mathematical representations. For example, the input analyzer may determine the FFT of the signal level evolution, the average number of dropped calls per period of time, instances of a low (e.g., 5%) signal level, average throughput per hour, geographic/network locations where the malfunction occurred, etc. The mathematical representations create a decomposed input to a search engine 262.

The search engine 262 treats the decomposed input as a preliminary alert that may need additional training to increase its confidence level. To that end, the search engine retrieves contextual information in the form of historical information from a data store server 264. The retrieved data is based on the selected components and the stored pattern of performance of these components. For example, the data retrieved from data store server 264 may be based on the same components, as well as other substantially similar components. Only scenarios that have a data pattern of the components that is within a first threshold tolerance of the preliminary alert are retrieved. Put differently, similar historic scenarios are retrieved from the data store server 264. The retrieved data also indicates that the user (or other similarly situated users—having a similar type of handheld device, using the same network, etc.) experienced similar number of dropped calls. The larger the number of similar situations that are retrieved, the higher the confidence level in the preliminary alert.

The preliminary alert can be trained to increase the confidence level by presenting different scenarios have different tolerances to the evaluator. In this example, the evaluator is the system administrator who selects the scenarios that are deemed to be consistent with a malfunction. In each iteration the tolerance may be tightened or loosened to define (e.g., fine-tune) the metes and bounds of the alert. The iterative process may be continued until the confidence level reaches a predetermined threshold (e.g., 85%), thereby promoting the preliminary alert into a primary alert.

In one embodiment, a prophylactic alert is developed based on the primary alert, such that a notification is sent to the appropriate recipient (e.g., user, system administrator, account holder, etc.) before the malfunction occurs. In this regard, the data pattern extracted by the one or more sensors of the components of the complex system is extrapolated and an alert is triggered in anticipation of the malfunction.

Accordingly, the system administrator is able to develop an alert to automatically identify future alerts and even prevent future malfunctions without having substantial data science knowledge. An overwhelming amount of performance metrics are quickly filtered and a vast amount of disparate data is turned into actionable performance insights. Malfunctions are identified and even prevented before a user becomes aware of them. Thus, an intelligent alert is provided based on vast amounts of disparate data with a high level of precision without requiring a substantial data science knowledge, intricate mathematical knowledge, or construction of algorithms.

Example Computer Platform

As discussed above, functions for measuring the performance of the components of a system, displaying KPI's of components, receiving a selection of one or more components, receiving a selection of data points or ranges of the performance of the components, developing a preliminary alert, retrieving historical data, training the preliminary alert into a primary alert, and other functions, can be implemented on computers connected for data communication via network 120, operating as the alert server 140, data store server 142, and various sensors 106, as shown in FIG. 1. Although special purpose devices may be used, such devices also may be implemented using one or more hardware platforms intended to represent a general class of data processing device commonly used to run "server" programming so as to implement functions such as receiving data from various sensor's, retrieving contextual information, analyzing information for determining whether a predetermined condition is met or tolerances are exceeded, and training alerts, as discussed above, albeit with an appropriate network connection for data communication.

Figure 5:
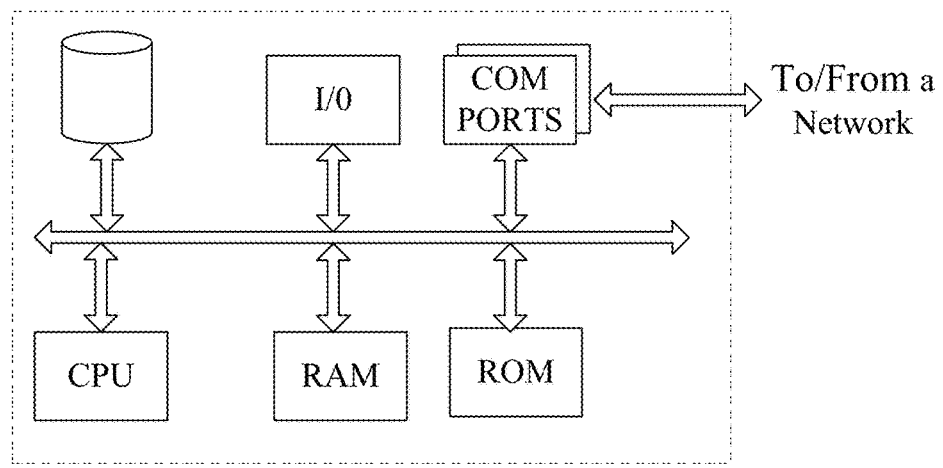
FIG. 5 illustrates a network or host computer.
Figure 6:
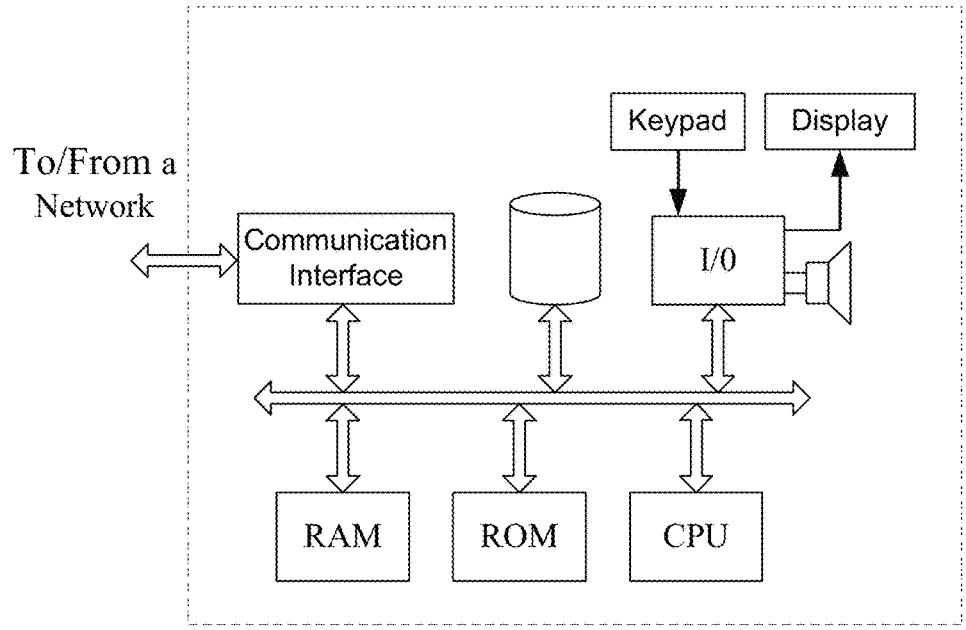
FIG. 6 illustrates a computer with user interface elements.

FIGS. 5 and 6 provide functional block diagram illustrations of general purpose computer hardware platforms. FIG. 5 illustrates a network or host computer platform, as may typically be used to implement a server, such as alert server 140 and data store server 142. FIG. 6 depicts a device with user interface elements, as may be used to implement a personal computer, such as computer 128 of FIG. 1 or a workstation, or to implement a computing device, such as sensor's 106(1) to 106(N), although the device of FIG. 6 may also act as a server if appropriately programmed. It is believed that the general structure and general operation of such equipment as shown in FIGS. 5 and 6 should be self-explanatory from the high-level illustrations.

A general purpose computer configured as a server, for example, includes a data communication interface for packet data communication over the network 120. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. As used herein, the computer system of FIG. 5 may use a massive parallel processing technology such as Hadoop, Storm, or Spark. Of course, the server functions may be implemented in a distributed fashion on a number of similar platforms, to distribute the processing load. In various other embodiments, the functionality of the alert server 140 and data store server 142, may be combined in one or more server platforms.

The software functionalities involve programming, including executable code as well as associated stored data, e.g., files used for applications on the alert server 140 to receive data from various sensor's, receiving a selection of components and data ranges thereof, retrieving contextual information from the data store server 142, preparing a data pattern for a preliminary alert, analyzing the data of the contextual information to find matches that are within predetermined tolerances, and training alerts to be promoted to primary alerts. The software code is executable by the computing device. In operation, the code is stored within the computing device. At other times, however, the software may be stored at other locations and/or transported for loading into the appropriate computing device system. Execution of such code by a processor of the computing device enables the computing device to perform functions of receiving sensor data, receiving a selection of components and data ranges thereof that are malfunctioning, retrieving information, analyzing information, etc., in essentially the manner performed in the implementations discussed and illustrated herein.

Hence, aspects of the methods of receiving and processing node data as outlined above may be embodied in programming Program aspects of the technology may be thought of as "products" or "articles of manufacture" typically in the form of executable code and/or associated data that is carried on or embodied in a type of non-transitory machine readable medium.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An alert server for providing a user interface and performing performance monitoring of a monitored networked system, the alert server comprising:
   a processor;
   a network interface coupled to the processor configured to enable communications via a communication network;
   a storage device for content and programming; and
   a program stored in the storage device, wherein execution of the program by the processor configures the alert server to perform acts comprising:
   displaying, through the user interface, key performance indicators (KPI's) of a plurality of components of the monitored network system;

receiving, through the user interface, a selection of one or more components of the plurality of components related to a malfunction in the monitored network system;

extracting at least a pattern of performance of the one or more selected components;

identifying one or more additional components pre-identified as being associated with the operation of the one or more components selected as being part of the malfunction;

extracting a pattern of performance of the one or more additional components;

creating a preliminary alert based at least on the pattern of performance of the one or more selected components and on the present status and pattern of performance of the one or more additional components;

retrieving a historical data related to the one or more selected components, wherein the historical data includes a plurality of historical scenarios in which each historical scenario has a corresponding pattern of performance that match within a tolerance of the pattern of performance for the one or more selected components that are associated with the preliminary alert;

presenting, through the user interface, the historical data;

receiving, through the user interface, feedback regarding the historical data;

training the preliminary alert based on at least one of the retrieved historical scenarios selected according to the feedback;

promoting the preliminary alert to a primary alert upon training the preliminary alert to a confidence level that is above a predetermined threshold in response to contextual information included in the historical data indicating that a number of previous manual identified instances of the malfunction for which no prior alert has been created reaches a sufficient predetermined threshold; and generating a machine learning (ML) training set for producing an additional alert regarding the monitored network system, the ML training set comprising the at least one of the retrieved historical scenarios used to train the preliminary alert into the primary alert.

2. The alert server of claim 1, wherein the KPI's are displayed and the selection of the one or more components is received on a dashboard of a user equipment (UE).

3. The alert server of claim 2, wherein execution of the program further configures the alert server to perform acts comprising:

receiving on the dashboard of the UE a selection of at least one of:
(i) one or more data points of the KPI's of the one or more components that are related to the malfunction; and
(ii) a data range over time of the KPI's of the one or more components that are related to the malfunction.

4. The alert server of claim 1, wherein the historical data is retrieved from a data store server configured to store historical data of the plurality of components of the network system and one or more other network systems.

5. The alert server of claim 4, wherein the data store server uses massive parallel processing technology of at least one of: (i) Hadoop, (ii) Storm, and (iii) Spark to retrieve the historical data.

6. The alert server of claim 4, wherein the historical data related to the one or more selected components includes data of one or more of a same type of components from the one or more other network systems.

7. The alert server of claim 1, wherein each retrieved historical scenario has a different pattern of performance.

8. The alert server of claim 1, wherein execution of the program further configures the alert server to perform acts comprising:

identifying one or more additional components pre-identified as being associated with the operation of the one or more components selected as being part of the malfunction, wherein retrieving the historical data related to the one or more selected components further includes retrieving historical data related to the one or more additional components.

9. The alert server of claim 1, wherein execution of the program further configures the alert server to perform acts comprising:

receiving a validation of at least some of the plurality of scenarios from an evaluator until a threshold confidence level in the preliminary alert is achieved; and discarding each scenario that has been identified by the evaluator to be not valid.

10. A non-transitory computer-readable medium having stored thereon a plurality of sequences of instructions which, when executed by one or more processors, cause the one or more processors to perform actions to provide a user interface and perform performance monitoring of a monitored network system, the actions comprising:

displaying, through the user interface, key performance indicators (KPI's) of a plurality of components of the monitored network system;

receiving, through the user interface, a selection of one or more components of the plurality of components related to a malfunction in the monitored network system;

extracting (i) a present status and (ii) a pattern of performance of the one or more selected components;

identifying one or more additional components pre-identified as being associated with the operation of the one or more components selected as being related to the malfunction;

extracting a pattern of performance of the one or more additional components;

creating a preliminary alert based on (i) the present status, (ii) the pattern of performance of the one or more selected components, and (iii) the pattern of performance of the one or more additional components;

retrieving historical data related to the one or more selected components, wherein the historical data includes a plurality of historical scenarios in which each historical scenario has (i) a status and (ii) a corresponding pattern of performance that match within a tolerance of the pattern of performance for the one or more selected components that are associated with the preliminary alert;

presenting, through the user interface, the historical data;

receiving, through the user interface, feedback regarding the historical data;

training the preliminary alert based on historical data selected according to the feedback and associated with a previously manually identified malfunction of the one or more components for which no prior alert has been created, the training including promoting the preliminary alert to a primary alert in response to the contextual information included in the historical data indicating that a number of previous manual identified instances of the malfunction for which no prior alert has been created reaches a sufficient predetermined threshold; and generating a machine learning (ML) training set for producing an additional alert regarding the monitored network system, the ML training set comprising the at least one of the retrieved historical scenarios used to train the preliminary alert into the primary alert.

11. The non-transitory computer-readable medium of claim 10, wherein the KPI's are displayed and the selection of the one or more components is received on a dashboard of a user equipment (UE).

12. The non-transitory computer-readable medium of claim 11, further comprising:
receiving on the dashboard of the UE a selection of at least one of:
(iii) one or more data points of the KPI's of the one or more components that are related to the malfunction; and
(iv) a data range over time of the KPI's of the one or more components that are related to the malfunction.

13. The non-transitory computer-readable medium of claim 10, wherein the historical data is retrieved from a data store server configured to store historical data of the plurality of components of the network system and one or more other network systems.

14. The non-transitory computer-readable medium of claim 13, wherein the historical data related to the one or more selected components includes data of one or more of a same type of components from the one or more other network systems.

15. The non-transitory computer-readable medium of claim 10, wherein each retrieved historical scenario has a different pattern of performance.

16. The non-transitory computer-readable medium of claim 10, further comprising:
extracting a present status of the one or more additional components; and
creating the preliminary alert based on the present status of the one or more additional components.

17. The non-transitory computer-readable medium of claim 10,
wherein retrieving the historical data related to the one or more selected components further includes retrieving historical data related to the one or more additional components.

18. The non-transitory computer-readable medium of claim 10, further comprising:
receiving a validation of at least some of the plurality of historical scenarios from an evaluator until a threshold confidence level in the preliminary alert is achieved; and
discarding each historical scenario that has been identified by the evaluator to be not valid.

19. A system for providing, using a user interface for configuring an alert for a monitored network system, the system comprising:

a processor
a strategy selector operative to receive a selection of a type of an alert calculation strategy;
an input generator comprising one or more utilities operative to receive, through the user interface, a selection of:
one or more components of the monitored network system that are related to a malfunction; and
at least one of: (i) one or more data points of key performance indicators (KPI's) of the one or more selected components, and (ii) a data range over time of the KPI's of the one or more selected components;
an input analyzer operative to:
receive the selection from the input generator;
extract at least one of (i) a present status and (ii) a pattern of performance of the selection; and
identify one or more additional components pre-identified as being associated with operation of the selected one or more components;
extract a pattern of performance of the one or more additional components;
create a preliminary alert based on the present status, the pattern of performance of the one or more selected components, and the pattern of performance of the one or more additional components;
a search engine operative to retrieve historical data related to the one or more selected components, and to present the historical data through the user interface, wherein the historical data includes a plurality of scenarios in which each historical scenario has (i) a status and (ii) a corresponding pattern of performance for the one or more selected components that match within a tolerance of the pattern of performance of the one or more selected components that are associated with the preliminary alert;
an evaluator block operative to train the preliminary alert, based on at least one of the plurality of scenarios selected according to feedback received through the user interface regarding the historical data, into a primary alert having confidence level that is above a predetermined threshold in response to contextual information included in the historical data indicating that a number of previous manual identified instances of the malfunction for which no prior alert has been created reaches a sufficient predetermined threshold; and
a machine learning (ML) training set for producing an additional alert regarding the monitored network system, the ML training set comprising the at least one of the retrieved historical scenarios used to train the preliminary alert into the primary alert, the additional alert having a higher confidence level than the preliminary alert.

* * * * *